United States Patent

Kuttanna et al.

[11] Patent Number: 5,974,505
[45] Date of Patent: Oct. 26, 1999

[54] METHOD AND SYSTEM FOR REDUCING POWER CONSUMPTION OF A NON-BLOCKING CACHE WITHIN A DATA PROCESSING SYSTEM

[75] Inventors: Belliappa Manavattira Kuttanna; Rajesh Bhikhubhai Patel, both of Austin, Tex.

[73] Assignees: International Business Machines Corporation, Armonk, N.Y.; Motorola, Inc., Schaumburg, Ill.

[21] Appl. No.: 08/927,131

[22] Filed: Sep. 2, 1997

[51] Int. Cl.$^6$ ........................................ G06F 13/16
[52] U.S. Cl. .......................... 711/118; 711/168; 711/167; 711/163; 711/145; 711/128
[58] Field of Search ............................... 711/3, 128, 118, 711/145, 163, 167, 168; 395/750.04, 872

[56] References Cited

U.S. PATENT DOCUMENTS

| | | |
|---|---|---|
| 5,420,808 | 5/1995 | Alexander et al. . |
| 5,671,444 | 9/1997 | Akkary et al. ............................ 395/872 |
| 5,761,715 | 6/1998 | Takahashi ................................ 711/128 |
| 5,809,314 | 9/1998 | Carmean et al. ................... 395/750.04 |
| 5,845,309 | 12/1998 | Shirotori et al. ............................. 711/3 |

OTHER PUBLICATIONS

Power PC 604 RISC Microprocessor User's manual, "Cache and Bus Interface Unit Operation," Chapter 3, pp. 1–18.
Sonya Gary et al., "PowerPC 603, A Microprocessor for Portable Computers," IEEE Design and Test of Computers, 1994, pp. 14–23.

*Primary Examiner*—John W. Cabeca
*Assistant Examiner*—David Laugjahr
*Attorney, Agent, or Firm*—Casimer K. Salys; Antony P. Ng; Andrew J. Dillon

[57] ABSTRACT

A method and system for reducing power consumption of a non-blocking cache memory within a data processing system is disclosed. In accordance with a method and system of the present disclosure, a detection unit, having several index-matching bits, is associated with the cache memory within the data processing system. A determination is made as to whether or not there is a match in the cache memory, in response to an occurrence of a cache request while the cache memory is performing a linefill operation. In response to a determination that there is not a match for the cache request in the cache memory, another determination is made as to whether or not there is a match for the cache request with a block of information within the ongoing linefill operation. In response to a determination that there is a match for the cache request with a block of information within the ongoing linefill operation, one of the index-matching bits is set and clocks to the cache memory are turned off temporarily in order to reduce power consumption by the cache memory.

11 Claims, 5 Drawing Sheets

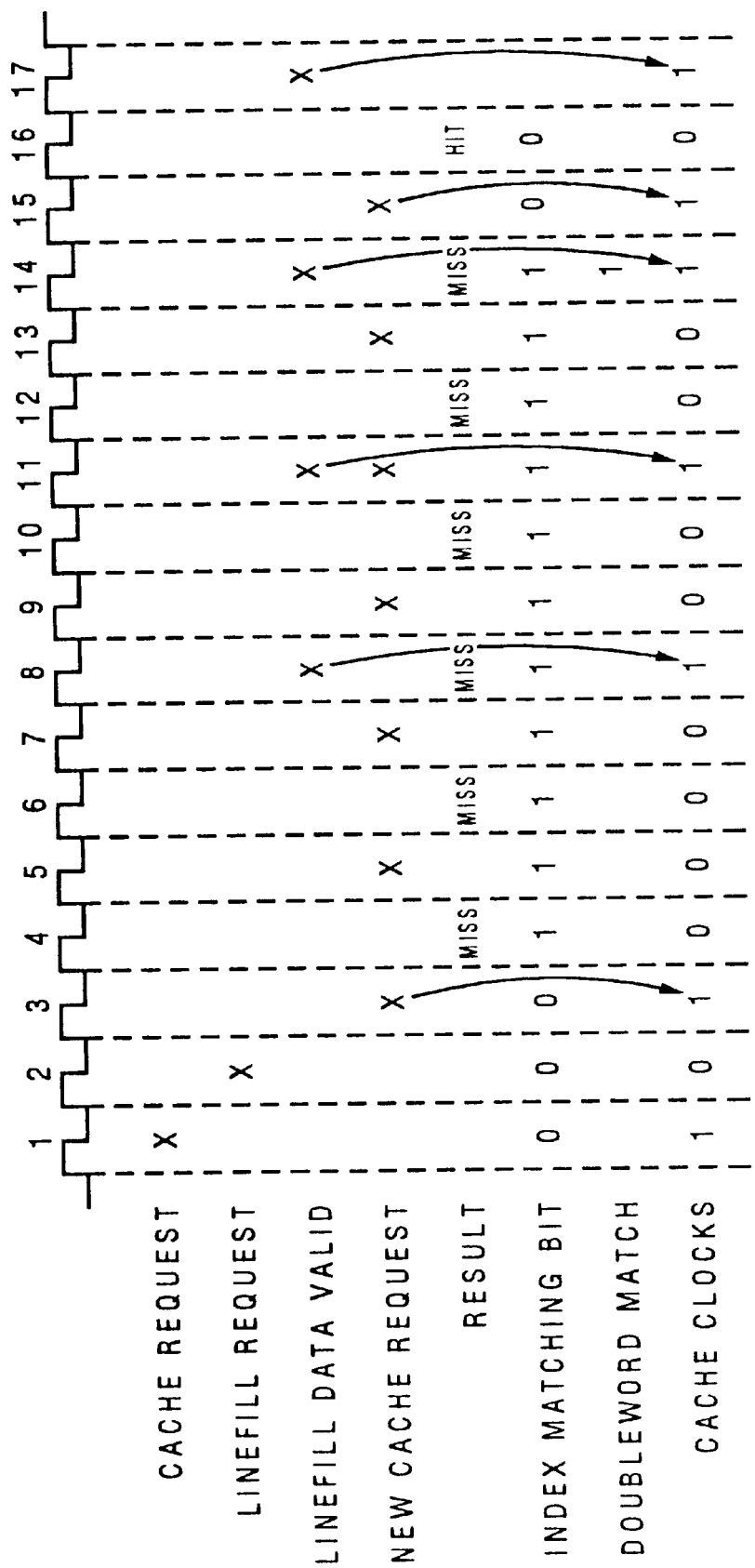

METHOD AND SYSTEM FOR REDUCING POWER CONSUMPTION OF A NON-BLOCKING CACHE WITHIN A DATA PROCESSING SYSTEM

BACKGROUND

1. Technical Field

The present disclosure relates to a method and system for energy conservation in general and, in particular, to a method and system for reducing power consumption within a data processing system. Still more particularly, the present disclosure relates to a method and system for reducing power consumption of a non-blocking cache within a data processing system.

2. Description of the Related Art

Lightweight notebook computers have become increasingly popular in recent years as many people are buying a notebook computer instead of a desktop computer as their primary computer. One of the many advantages a notebook computer offers is portability, and frequently, this portability is enhanced by its ability to operate under battery power. Needless to say, it is preferable to have a battery-powered notebook computer operate under battery power for an extended period of time before the battery needs recharging or replacing. Accordingly, from a design standpoint, it is important to reduce the power consumption of a notebook computer in order to extend the time during which the computer operates before any recharging or replacing of battery is required.

A microprocessor within a notebook computer typically accounts for up to one-third of the notebook computer's total power budget, which is around 15 W. Hence, a microprocessor originally designed for high-end desktop computers, which requires a 5V power supply and dissipates up to 16 W, is probably not a suitable candidate for notebook computer applications. For a microprocessor specifically designed to be utilized in notebook computer applications, at least three criteria must be met. First, there must be low power dissipation during the normal operation of the microprocessor. Second, there must be features for power management within the microprocessor, such as dynamic power management, and third, the most important of all from a user standpoint, the processing power of the microprocessor must be comparable to its desktop counterparts.

One of such low-power microprocessor design is disclosed in U.S. Pat. No. 5,420,808, entitled "Circuitry and Method for Reducing Power Consumption within an Electronic Circuit," and that patent is incorporated herein by reference thereto. The disclosed method under the above-referenced patent allows the microprocessor to consume less excess power without drastically sacrificing overall performance. In addition, the disclosed method is completely transparent to a user.

In light of U.S. Pat. No. 5,420,808, the present disclosure reveals a method for reducing power consumption of a non-blocking cache within a data processing system. The power consumption reduction method under the present disclosure may be implemented in any data processing system either independently or in conjunction with the method under U.S. Pat. No. 5,420,808. By implementing the method under the present disclosure in conjunction with the method under U.S. Pat. No. 5,420,808, an even lower power consumption level can certainly be achieved than utilizing the method under U.S. Pat. No. 5,420,808 alone.

SUMMARY

It is therefore an object of the present disclosure to provide an improved method and system for energy conservation.

It is another object of the present disclosure to provide an improved method and system for reducing power consumption within a data processing system.

It is yet another object of the present disclosure to provide an improved method and system for reducing power consumption of a non-blocking cache within a data processing system.

In accordance with a method and system of the present disclosure, a detection unit, having several index-matching bits, is associated with a cache memory within a data processing system. A determination is made as to whether or not there is a match in the cache memory, in response to an occurrence of a cache request while the cache memory is performing a linefill operation. In response to a determination that there is not a match for the cache request in the cache memory, another determination is made as to whether or not there is a match for the cache request with a block of information within the ongoing linefill operation. In response to a determination that there is a match for the cache request with a block of information within the ongoing linefill operation, one of the index-matching bits is set and clocks to the cache memory are turned off in order to reduce power consumption by the cache memory.

All objects, features, and advantages of the present disclosure will become apparent in the following detailed written description.

BRIEF DESCRIPTION OF THE DRAWINGS

The disclosure itself, as well as an illustrative mode of use, further objects, and advantages thereof, will best be understood by reference to the following detailed description of an illustrative disclosure when read in conjunction with the accompanying drawings, wherein:

FIG. 5 is a timing diagram depicting the clock cycles of a non-blocking cache having a second cache request during a linefill operation under the present disclosure.

DETAILED DESCRIPTION OF AN ILLUSTRATIVE EMBODIMENT

An illustrative embodiment under the present disclosure may be implemented on a variety of processors designed to have low power consumption. For the purpose of illustration, an exemplary embodiment as described below is implemented on one of the PowerPC™ microprocessors manufactured by International Business Machines Corporation, which is intended for notebook computer applications.

Figure 1:
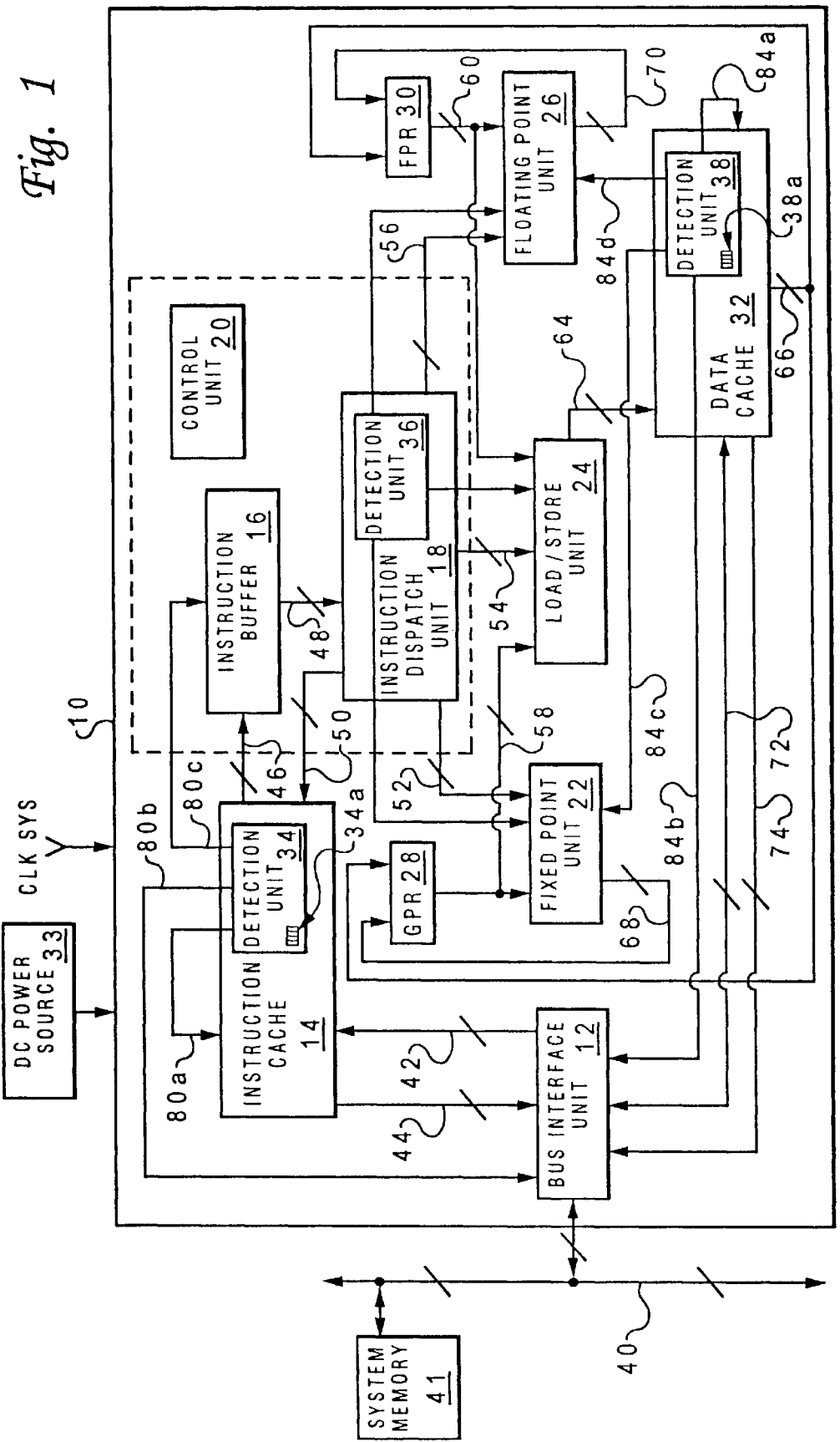
FIG. 1 is a conceptual block diagram of a processor in accordance with an exemplary embodiment of the present disclosure.

Referring now to the drawings and in particular to FIG. 1, there is depicted a conceptual block diagram of processor 10 in accordance with an exemplary embodiment of the present disclosure. As shown, processor 10 includes a bus interface unit 12, an instruction cache 14, an instruction buffer 16, an instruction dispatch unit 18, a control unit 20, a fixed-point unit 22, a load/store unit 24, a floating-point unit 26, general purpose registers 28, floating-point registers 30, and a data cache 32.

Bus interface unit 12 is connected bi-directionally to a system bus 40 external to processor 10. A system memory 41 is also coupled to system bus 40. Instruction cache 14 is coupled to bus interface unit 12 through a data bus 42 and through an instruction bus 44. Instruction buffer 16 is coupled to instruction cache 14 through an instruction bus 46. Instruction dispatch unit 18 is coupled to instruction buffer 16 through an instruction bus 48. Instruction dispatch unit 18 is further coupled to instruction cache 14 through an instruction request bus 50. Fixed-point unit 22 is coupled to instruction dispatch unit 18 through an instruction bus 52. Load/store unit 24 is coupled to instruction dispatch unit 18 through an instruction bus 54. Floating-point unit 26 is coupled to instruction dispatch unit 18 through an instruction bus 56.

Moreover, fixed-point unit 22 is coupled to general purpose registers 28 through a data bus 58. Floating-point unit 26 is coupled to floating-point registers 30 through a data bus 60. Also, load/store unit 24 is coupled to general purpose registers 28 through a data bus 58. Load/store unit 24 is further coupled to floating-point registers 30 through a data bus 60. Data cache 32 is coupled to load/store unit 24 through a data bus 64. General purpose registers 28 are coupled to data cache 32 through a data bus 66. Floating-point registers 30 are also coupled to data cache 32 through a data bus 66. General purpose registers 28 are coupled to fixed-point unit 22 through a data bus 58. Floating-point registers 30 are also coupled to floating-point unit 26 through a data bus 70. Data cache 32 is coupled to bus interface unit 12 through a data bus 72 and through an address bus 74.

In addition, processor 10 is connected to an external system clock line $CLK_{SYS}$, from which processor 10 receives its clock signals. Further, processor 10 is connected to a DC power source 33, such as a battery or an AC-to-DC converter, from which processor 10 receives its power. For clarity, the distribution of power from DC power source 33 throughout processor 10 is not shown in FIG. 1.

Processor 10 is a CMOS circuit having multiple interconnects. CMOS circuits do not consume significant power if signals on interconnects are not actively transitioning between various levels. Thus, when these interconnects are held in a steady state, power consumption of processor 10 can be reduced. For example, power consumption may be reduced by holding the latch data of processor 10. Nevertheless, even if the latch data are held constant, the local clock regenerators continue to switch a significant amount of capacitance through clock signal lines distributed throughout processor 10 to various latches. Accordingly, local clock regenerators result in a significant amount of power consumption within processor 10.

As it is well-known in the art that the power consumptions in various sections of processor 10 can be reduced if certain power-saving conditions are satisfied. More particularly, a section's power consumption can be reduced by reducing a clock signal transition from the section's local clock regenerators to a zero frequency. In this manner, the section's functional logic is stopped, and accordingly, the power consumption of the section's functional logic and of the section's clock signal lines distributed to latches becomes negligible.

Thus, processor 10 is preferably partitioned for the clock regenerators, so that latches sharing a common power-saving hold condition are grouped together. Such grouping is a primary power reduction aspect of processor 10. By grouping clock regenerators and by detecting power-saving hold conditions, power is reduced on processor 10 because a majority of interconnects do not transition between levels unnecessarily.

Also, in a significant power-reduction aspect of the exemplary embodiment, instruction cache 14 includes a detection unit 34 and data cache 32 includes a detection unit 38. Although detection units 34 and 38 are shown as being integral with other units of processor 10, detection units 34, 38 can be defined separately from the other units and yet still be integral with processor 10.

Detection unit 34 is coupled to lookup logic in instruction cache 14 through a hold line 80a. Detection unit 34 is further coupled to bus interface unit 12 through a wakeup line 80b. Also, detection unit 34 is coupled to certain buffer locations of instruction buffer 16 through a hold line 80c. Within detection unit 34, there are several index-matching bits 34a.

Detection unit 38 is coupled to lookup logic in data cache 32 through a hold line 84a. Further, detection unit 38 is coupled to bus interface unit 12 through a wakeup line 84b. Also, detection unit 38 is coupled to fixed-point unit 22 through a hold line 84c, and to floating-point unit 26 through a hold line 84d. Within detection unit 38, there are several index-matching bits 38a.

During operation, instruction dispatch unit 18 requests an output of instruction information from instruction cache 14 through instruction request bus 50. If instruction cache 14 contains a requested instruction, then instruction cache 14 outputs the requested instruction to instruction buffer 16 through instruction bus 46. After instruction buffer 16 receives the requested instruction from instruction cache 14, instruction dispatch unit 18 obtains the requested instruction from instruction buffer 16 through instruction bus 48.

If instruction cache 14 does not contain a requested instruction, then a linefill operation must be performed in order to obtain the requested instruction from system memory 41 via external system bus 40. A significant period of time may elapse after instruction cache 14 sends the requested instruction to bus interface unit 12 and before the critical doubleword of the cache line returns. Also, there are significant time lapses between each beat of returning information subsequent to the critical doubleword.

Similarly, if data cache 32 does not contain data requested by load/store unit 24 for fixed-point unit 22 (or for floating-point unit 26), then a linefill operation must be performed in order to obtain the requested instruction from system memory 41 via external system bus 40. A significant period of time may elapse after data cache 32 sends the requested instruction to bus interface unit 12 and before the critical doubleword of the cache line returns. Also, there are significant time lapses between each beat of returning information subsequent to the critical doubleword.

Figure 2:
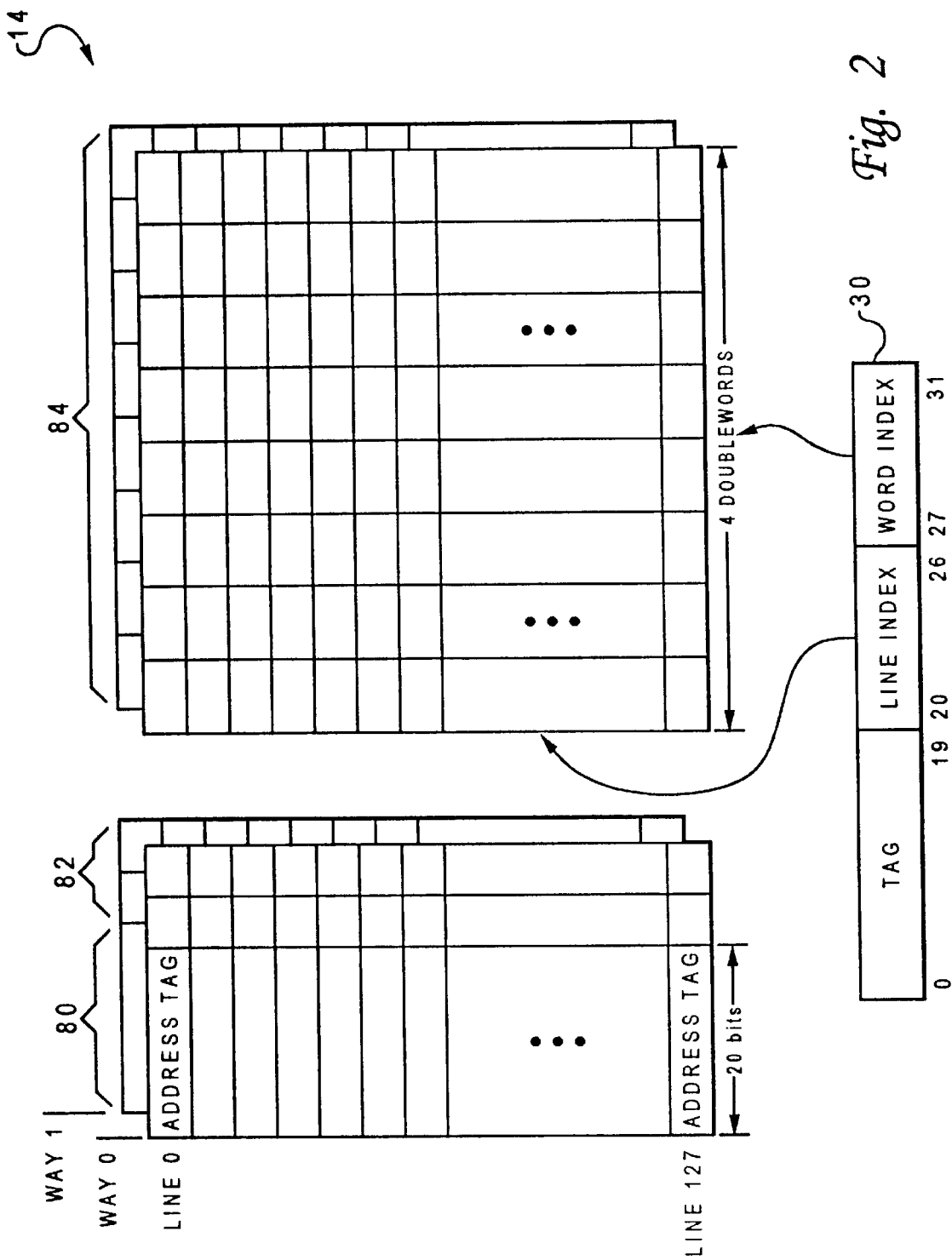
FIG. 2 is a block diagram of the organization of an 8-Kbyte instruction cache in according with an illustrative embodiment of the disclosure.

With reference now to FIG. 2, there is depicted a block diagram of the organization of an 8-Kbyte instruction cache 14 according to an illustrative embodiment of the disclosure. Instruction cache 14 is configured as a two-way cache—way 0 and way 1, with each way having 128 cache lines, from line 0 to line 127. Each cache line comprises an address tag 80, one valid bit 82, and instruction block 84. Instruction block 84 is 32 bytes (or 4 doublewords) wide while address tag 80 is only 20 bits wide.

Each cache line is indexed by bits 20–26 of an address 30, and each byte within the cache line is indexed by bits 27–31 of address 30. In addition, address tag 80 within each cache line contains an address tag that is utilized for comparison with bits 0–19 of address 30 in order to determine whether there is a cache "hit" or "miss." Incidentally, a match between address tag 80 in one of ways 0 or 1 and bits 0–19 of address 30 means a cache "hit." Further, valid bit 82 is for indicating whether that particular cache line is valid or not. Typically, a "1" means the instruction in the cache line is valid while a "0" means the instruction in the cache line is not valid, though a reverse assignment is also acceptable. The organization of data cache 32 is similar to that of instruction cache 14.

Figure 3:
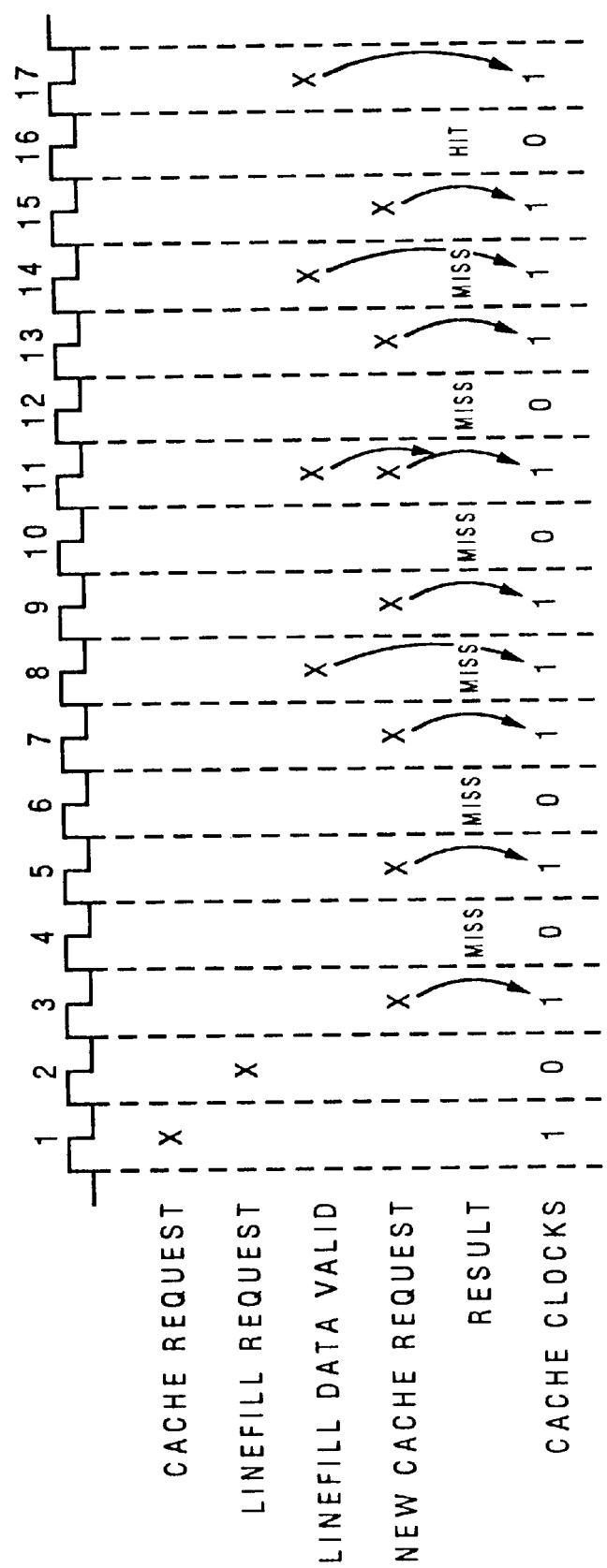
FIG. 3 is a timing diagram depicting the clock cycles of a non-blocking cache having a second cache request during a linefill operation under prior art.

Referring now to FIG. 3, there is depicted a timing diagram of the cache clocks of a non-blocking cache having a new cache request during a linefill operation under prior art. During the linefill operation, there is already a provision under the prior art to turn off the clocks of the non-blocking cache when the cache is waiting for the critical doubleword (or critical word, depending on cache architecture) of the instruction or data from the bus interface unit, in order to reduce power consumption by the idle cache. During this time, a new request to the cache may occur. For a blocking cache, because it cannot process any other request during a linefill operation, the new cache request is not an issue. However, a non-blocking cache still has to attend to the new cache request. When there is a cache "miss" to the new cache request, the cache must continue to check whether or not the information requested by the new cache request is in any one of the incoming doubleword of the ongoing linefill operation. Hence, the clocks to the cache cannot be turned off between incoming data during the linefill operation, such as cycles 3, 5, 7, etc. As such, the power reduction scheme for the cache as originally contemplated is defeated, especially when the situation of a cache request during an ongoing linefill operation occurs quite often.

Figure 4:
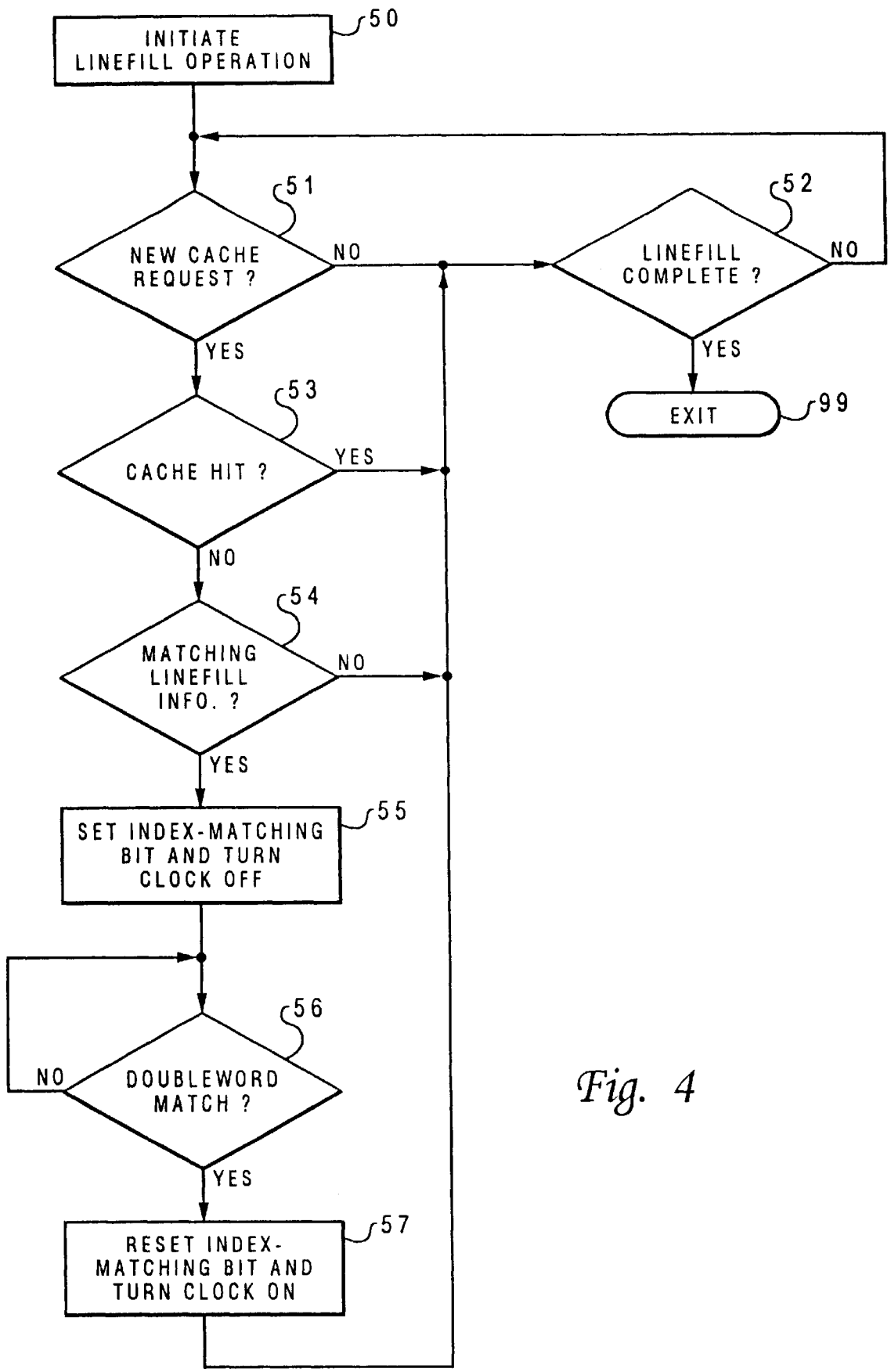
FIG. 4 is a high-level logic flow diagram of a method for reducing power consumption in a non-blocking cache within a data processing system, in accordance with an exemplary embodiment of the present disclosure.

With reference now to FIG. 4, there is illustrated a high-level logic flow diagram of a method for reducing power consumption in a non-blocking cache within a data processing system, in accordance with an exemplary embodiment of the present disclosure. Because the exemplary embodiment of the present disclosure functions during the time span of an ongoing linefill operation; hence the flow diagram begins with an initiation of a linefill operation, as illustrated in block 50. A determination is made as to whether or not there is another (new) request to the cache, as shown in block 51. If there is no further request to the cache, another determination is made as to whether the linefill operation has completed or not, as depicted in block 52. If the linefill operation has not yet completed, the process returns back to block 51. Otherwise, if the linefill operation has completed, the process exits at block 99.

However, if there is another request to the cache during the linefill operation, a determination is made as to whether or not there is a "hit" in the cache, as shown in block 53. If there is a cache "hit," the process proceeds to block 52 to wait for the completion of the linefill operation. Otherwise, if there is no cache "hit," a determination is made as to whether or not the cache request is requesting a block of information that is currently being fetched from the system memory by the ongoing linefill operation, as illustrated in block 54. If the cache request is not requesting the same block of information that is currently being fetched, the process returns back to block 52 to wait for the completion of the linefill operation. Otherwise, if the cache request is requesting the same block of information that is currently being fetched, a corresponding index-matching bit is set and the clocks to the cache are turned off, as shown in block 55. As mentioned previously, there are several index-matching bits stored within a detection unit of the cache. For example, in the instruction cache as shown in FIG. 2, there are four index-matching bits within the detection unit. Each index-matching bit is utilized to relate to one of the four doublewords within a cache line, which will be further explained.

Next, a determination is made as to whether or not there is a doubleword match, as illustrated in block 56. If there is no doubleword match, the process loops back to block 56. Otherwise, if there is a doubleword match, the corresponding index-matching bit, previously set, is reset and the cache clocks are turned back on again, as depicted in block 57, and the process returns back to block 52 to wait for completion of the linefill operation.

| Linefill Critical Doubleword | Requested Address | Index Matching Bit 0 | Index Matching Bit 1 | Index Matching Bit 2 | Index Matching Bit 3 |
|---|---|---|---|---|---|
| Doubleword 0 | Dword 0 | X | | | |
| | Dword 1 | | X | | |
| | Dword 2 | | | X | |
| | Dword 3 | | | | X |
| Doubleword 1 | Dword 0 | | | | X |
| | Dword 1 | X | | | |
| | Dword 2 | | X | | |
| | Dword 3 | | | X | |
| Doubleword 2 | Dword 0 | | | X | |
| | Dword 1 | | | | X |
| | Dword 2 | X | | | |
| | Dword 3 | | X | | |
| Doubleword 3 | Dword 0 | | X | | |
| | Dword 1 | | | X | |
| | Dword 2 | | | | X |
| | Dword 3 | X | | | |

For the step shown in block 54 of FIG. 4, an Index Compare Logic (ICL) is utilized to compare an index value of a first cache request that "misses" with an index value of a subsequent cache request. If a match is detected, an appropriate index-matching bit within a detection unit of the cache is set until the doubleword corresponding to the subsequent cache request is received back from the system bus. The assertion of the index-matching bit is based upon the assumption that the critical doubleword is always the first doubleword to be fetched from the system memory as shown in Table I. The clocks to the tag and cache data arrays are then turned off as long as one of the index-matching bits remains asserted, preventing unnecessary tag lookups. As such, unnecessary power dissipation from the cache is avoided.

The exemplary method of the present disclosure can be further demonstrated by the following example. Consider a code sequence in which a LOAD to address $12345660_{hex}$ is followed by a STORE to address $12345670_{hex}$. Assuming the LOAD (a first cache request) misses in the cache, which initiates a linefill operation, and the STORE (a subsequent cache request) also misses in the cache. The tagwrite of the LOAD request is performed when the critical doubleword (corresponding to addresses $12345660_{hex}$ and $12345664_{hex}$) is fetched from the system bus for writing into the cache arrays. The ICL detects a line index match and determines that the doubleword corresponding to the STORE address of $12345670_{hex}$ is the third beat to be fetched. Thus, the third index-matching bit within the detection unit of the cache will be set from the time that the cache "miss" is detected to the time that the third beat of the linefill operation has been fetched. Once the third beat is received, the STORE is serviced. This example is graphically illustrated by a timing diagram in FIG. 5.

If the ICL detects a mismatch between the indexes, the clocks to the cache and tag arrays will remain turned off until the whole linefill operation is complete. For example, consider a code sequence where a LOAD to address $12345660_{hex}$ is followed by a STORE to address $12345FF0_{hex}$. Assuming that the LOAD misses in the cache, a linefill operation is initiated. If the STORE also misses in the cache and the ICL detects a line index mismatch, the cache clocks will be turned off until the linefill operation is fully completed. However, if the subsequent cache request is dispatched to the cache after the critical doubleword and an index mismatch is detected, the cache clocks will again be turned off. It should be noted that the cache clocks are turned on in the cycles during which the beats of the linefill data are being written into the cache, such as cycles 8, 11, 14, and 17 of FIG. 4.

As has been described, the present disclosure provides a method for reducing power consumption of a non-blocking cache memory within a data processing system. The exemplary method as illustrated under the present disclosure may be implemented independently or in conjunction with the other power-saving methods for maximizing power consumption reduction efforts in a low power data processing system having a non-blocking instruction cache and/or a data cache. In particular, the exemplary method, as disclosed, helps to reduce power dissipation significantly for data processing systems having large non-blocking instruction caches and/or data caches.

While the disclosure has been particularly shown and described with reference to an illustrative embodiment, it will be understood by those skilled in the art that various changes in form and detail may be made therein without departing from the spirit and scope of the disclosure.

What is claimed is:

1. A method of reducing power consumption by a non-blocking cache memory within a data processing system, said method comprising the steps of:

in response to receipt of a request for information by said non-blocking cache memory during an ongoing linefill operation within said non-blocking cache memory, determining whether or not said information matches with linefill information in said ongoing linefill operation; and in response to a determination that said information matches with linefill information in said ongoing linefill operation, setting an index-matching bit within said non-blocking cache such that said request is ignored by said non-blocking cache memory during said ongoing linefill operation.

2. The method according to claim 1, wherein said method further includes a step of resetting said index-matching bit after a doubleword is received by said cache memory.

3. The method according to claim 1, wherein said method further includes a step of waiting for a completion of said ongoing linefill operation, in response to a determination that said linefill operation does not include said information.

4. The method according to claim 1, wherein said setting step further includes a step of temporarily disabling at least one clock to said cache memory.

5. The method according to claim 4, wherein said disabling step further includes a step of temporarily disabling a clock to a tag of said cache memory.

6. A cache memory having a mechanism for reducing power consumption during cache memory operations, said cache memory comprising:

means, responsive to receipt of a request for information by said non-blocking cache memory during an ongoing linefill operation within said non-blocking cache memory, for determining whether or not said information matches with linefill information in said ongoing linefill operation; and means for setting an index-matching bit within said non-blocking cache such that said request is ignored by said non-blocking cache memory during said ongoing linefill operation, in response to a determination that said information matches with linefill information in said ongoing linefill operation.

7. The cache memory according to claim 6, wherein said cache memory further includes a means for resetting said index-matching bit after a doubleword is received by said cache memory.

8. The cache memory according to claim 6, wherein said cache memory further includes a means for waiting for a completion of said ongoing linefill operation, in response to a determination that said linefill operation does not include said information.

9. The cache memory according to claim 6, wherein said means for setting further includes a means for temporarily disabling at least one clock to said cache memory.

10. A data processing system having a mechanism for reducing power consumption of a cache memory, said data processing system comprising:

a processor;

a cache memory;

means, responsive to receipt of a request for information by said non-blocking cache memory during an ongoing linefill operation within said non-blocking cache memory, means for determining whether or not said information matches with linefill information in said ongoing linefill operation; and means for setting an index-matching bit within said non-blocking cache such that said request is ignored by said non-blocking cache memory during said ongoing linefill operation, in response to a determination that said information matches with linefill information in said ongoing linefill operation.

11. The cache memory according to claim 9, wherein said means for disabling further includes a means for temporarily disabling a clock to a tag of said cache memory.

* * * * *